United States Patent Office 3,574,637
Patented Apr. 13, 1971

3,574,637
CAKE MIXES FOR PREPARING LARGE, DELECTABLE CAKES
Arlee A. Andre, Douglas County, Nebr., assignor to The Procter & Gamble Company, Cincinnati, Ohio
No Drawing. Filed Mar. 15, 1967, Ser. No. 623,212
Int. Cl. A21d *13/08*
U.S. Cl. 99—94                                          3 Claims

ABSTRACT OF THE DISCLOSURE

A dry prepared cake mix which provides large volume delectable cakes comprises (a) sugar; (b) flour, the ratio of sugar to flour being less than 1.1:1; (c) shortening containing (1) greater than 6% alpha-phase crystal-tending emulsifiers, and (2) greater than 0.1% high temperature batter stabilizers; (d) greater than 0.8% leavening soda; and (e) a slow-acting leavening acid selected from sodium aluminum phosphate, dicalcium phosphate, and glucono-delta-lactone.

BACKGROUND OF THE INVENTION

This invention relates to novel edible compositions of matter and, more particularly, to new and improved dry prepared cake mixes and baked cakes.

So-called "dry" prepared mixes used for baking are made by combining sugar, flour, shortening, and other ingredients including leavening, milk solids, egg solids, flavoring, and coloring, to form a free-flowing granular mixture. To prepare these dry mixes for baking, liquid materials such as water, milk, and eggs are added, and the combination is beaten to form a homogeneous mixture and to incorporate air. The resulting batter is then baked.

The volume, texture, and eating qualities of baked cakes are dependent upon interaction of the various ingredients during the aforesaid mixing operation in which an emulsion or cake batter is formed, and upon stabilization of this emulsion or batter during subsequent baking and/or storage of the cake. Many attempts have been made to improve the emulsion characteristics of cake batter systems and cakes by incorporating therein various amounts of edible additives which are able to improve the collodial properties of the proteinaceous, amylaceous, or oleaginous constitutents. For example, Howard, in U.S. Pat. 3,145,107, 3,145,108 and 3,145,109, issued Aug. 18, 1964, discloses novel shortening containing various added amounts of certain alpha-phase crystal-tending emulsifiers and high temperature batter stabilizers. The shortenings of the Howard patents show the unique property of providing acceptable cages with "single-stage batter mixing" in which all the cake ingredients are simultaneously mixed together in the mixing container as distinguished from the conventional multi-stage "creaming" or "blending" methods ordinarily used in cake batter preparation.

Strobel, in U.S. Pat. 3,268,338, isued Aug. 23, 1966, discloses the stabilization of cake batter systems such as those described in the aforesaid Howard patents by utilizing small amounts of certain non-toxic, water-soluble, polyvalent metal ion salts. The present discovery represents yet a different advance over the basic inventions of Howard.

It has long been desired to optimize the volume of cakes for it is well known that the consumer prefers the largest, lightest cake possible commensurate with good cake structure, appearance and eating quality. As is readily apparent, the volume per se of a cake is not the critical measurement since this value can be adjusted by merely adjusting the quantity of components which comprise the cake. What is important, however, and what it is desired to optimize, is the specific volume of the cake, i.e., the volume of a baked cake resulting from a given quantity of dry ingredients and/or batter. Therefore, as used herein the term "specific volume" refers to the volume of a baked cake per unit weight of dry prepared mix.

SUMMARY OF THE INVENTION

Briefly stated, this invention involves the discovery of novel dry prepared mixes which yield cakes having an unexpectedly high specific volume. The cases of the present invention have specific volumes that are substantially and significantly greater than those of cakes prepared from any presently available dry prepared mix. Moreover, these large specific volumes are concurrently achieved with good cake structure, appearance and delectable eating quality.

The dry prepared mixes of the present invention utilize shortening systems similar to those described in the above-mentioned patents of Howard which contain a combination of an alpha-phahe crystal-tending emulsifier and a high temperature batter stabilizer. In addition, the mixes of the present invention are characterized by the use of certain slow-acting leavening acids and by certain critical proportions of the other ingredients, particularly the leavening soda, sugar and flour.

As a more specific summary, the dry prepared cake mixes of the present invention comprise:

(a) sugar;

(b) flour, the weight ratio of sugar to flour being less than 1.1:1;

(c) shortening containing (1) greater than 6% by weight of the shortening of alpha-phase crystal-tending emulsifiers, and (2) greater than 0.1% by weight of the shortening of high temperature batter stabilizers;

(d) leavening soda in an amount greater than 0.8% by weight of the dry prepared mix; and (e) a slow-acting leavening acid selected from the group consiting of sodium aluminum phosphate, dicalcium phosphate and glucono-delta-lactone.

DESCRIPTION OF THE PREFERRED EMBODIMENTS

Certain preferred embodiments of the cake mix composition of this invention reside in specific formulas for each of the three basic types of cakes, yellow, white, and devil's food (chocolate), as follows:

Dry prepared mix for yellow-type cakes

| Ingredients: | Percent by weight |
|---|---|
| Flour | 40–50 |
| Sugar | 30–40 |
| Shortening containing 8%–20% by weight of alpha-phase crystal-tending emulsifiers and 0.1%–5% by weight of high temperature batter stabilizers | 9–15 |
| Leavening soda | 1.0–1.5 |
| Leavening acid | 0.8–1.5 |
| Salt | 0–2 |
| Egg solids | 0–5.0 |
| Nonfat dried milk solids, water binders | 0–5.0 |
| Flavoring, coloring | Balance |

Dry prepared mix for white-type cakes

| Ingredients: | Percent by weight |
|---|---|
| Flour | 40–55 |
| Sugar | 30–40 |
| Shortening containing 6%–12% by weight of alpha-phase crystal-tending emulsifiers and 0.1%–3% by weight of high temperature batter stabilizers | 8–12 |
| Leavening soda | 1.0–1.5 |
| Leavening acid | 1–2 |
| Salt | 0–2.0 |
| Nonfat dried milk solids, water binders | 0–5.0 |
| Flavoring, coloring | Balance |

Dry prepared mix for devil's food-type cakes

| Ingredients: | Percent by weight |
|---|---|
| Flour | 38–45 |
| Sugar | 30–41 |
| Shortening containing 8%–16% by weight of alpha-phase crystal-tending emulsifiers and 0.1%–4% by weight of high temperature batter stabilizers | 9–15 |
| Leavening soda | 1.5–3.0 |
| Leavening acid | 0.2–1.5 |
| Cocoa | 2–8 |
| Milk solids, water binders | 0–8 |
| Salt | 0–2.0 |
| Flavoring, coloring | Balance |

A wide assortment of cake mixes can be prepared from the basic types disclosed above by varying the flavor, color and other minor constituents. For example, spice, lemon, orange, caramel, marble, mint, cherry, Swiss chocolate, and coconut cake mixes can all be prepared utilizing the basic formulae set forth above.

A critical feature of the cake mixes of this invention is the proportion of sugar to flour, or more simply, the sugar/flour ratio. The cake mixes of this invention must have a sugar/flour ratio of less than 1.1:1. A sugar/flour ratio of greater than 1.1:1 in the mixes of this invention negates the advantageous specific volume effects described herein and, in addition, tends to adversely affect the cake structure and appearance. A very preferred sugar/flour ratio is within the range of from about 0.7:1 to about 1.05:1 for the devil's food-type mixes and is within the range of from about 0.7:1 to about 0.9:1 for the yellow-type and white-type mixes.

The sugar can be any of the commonly used granular sugars such as sucrose, dextrose, maltose, fructose, lactose and brown and invert sugars. The sugar can also be in powder form and mixtures of more than one type of sugar can be used. Sucrose and dextrose, alone or in admixture, are the preferred sugars for use herein.

The flour should be the usual soft cake flour, preferably containing at least 50% wheat flour. Small proportions, e.g., up to about 10%, of the flour can be of the high protein variety and/or starch.

The shortenings which can be employed in the prepared cake mixes of this invention include solid or plastic as well as liquid or semi-fluid glyceride shortenings derived from animal, vegetable or marine fats and oils, including synthetically prepared shortenings. These glycerides can contain saturated or unsaturated "long-chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucoyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl; they can be prepared by random or low temperature interesterification reactions of fatty triglyceride-containing oils and fats, such as interesterified or rearranged cottonseed oil and lard; and they can be otherwise formed by various organic syntheses.

The shortening must contain at least 6%, and preferably less than 20%, of an alpha-phase crystal emulsifier or mixtures thereof, and at least 0.1%, and preferably less than 5%, of a high temperature batter stabilizer or mixtures thereof. The minimum amounts of alpha-phase crystal-tending emulsifiers and high temperature batter stabilizers are critical to achieve the desired specific volumes, eating qualities, appearance and structure in cakes prepared from the mixes of this invention. A very preferred amount of alpha-phase crystal-tending emulsifiers is within the range of from 8%–20%, 6%–12% and 8%–16%, for the yellow-type, white-type, and devil's food-type mixes, respectively. A very preferred amount of high temperature batter stabilizers is within the range of from 0.1%–5%, 0.1%–3%, and 0.1%–4% for the yellow-type, white-type, and devil's food-type mixes, respectively.

The alpha-phase crystal-tending emulsifiers of this invention are both lipophilic and hydrophilic and contain in the molecule at least one higher fatty acid radical having from about 12 to about 22 carbon atoms and at least one free unesterified hydroxyl group. Said emulsifiers are characterized by their tendency to crystallize in an alpha-phase rather than a beta- or beta-prime phase. These types of polymorphic crystalline structures can be identified by their X-ray diffraction patterns and are described in U.S. Pats. 2,521,241–2, granted to Mitchell, Sept. 5, 1950. The alpha-phase crystelline form is the least stable, least dense, and lowest melting of these crystalline forms.

Among the alpha-phase crystal-tending emulsifiers that can be used in the practice of this invention are the monoesters of straight chain aliphatic diols with saturated fatty acids, said diols containing from 3 to 5 carbon atoms and said saturated fatty acids containing from about 14 to about 22 carbon atoms, said materials being set forth by way of example only, and the invention is not to be limited to these specific alpha-phase crystal-tending emulsifiers.

The foregoing alpha-phase crystal-tending emulsifiers include, by way of example: propylene glycol monostearate; 1,3-propanediol monostearate; 1,4-butanediol monostearate; 1,3-butanediol monostearate; 1,5-pentanediol monostearate; and the corresponding monoesters of the preceding-named diols with myristic acid, palmitic acid, arachidic acid, and behenic acid. The said diol monoesters can be prepared by direct esterification or interesterification of the diol by reaction with the desired fatty acid or a fatty ester of a monohydric or polyhydric alcohol under appropriate conditions of temperature, either with or without catalyst and/or solvent. In the direct reactions between fatty acid and diol, the reactants are normally mixed in ratios of 1 mole of fatty acid to .75 or more moles of diol. The yield of monoester is enhanced by using solvents such as dimethylformamide, dimethylacetamide, dimethylsulfoxide, xylene, or toluene; and catalysts such as p-toluene sulfonic acid, sulfuric acid, hydrogen chloride, or zinc chloride and other acidic or salt types are particularly effective in accelerating the rate of esterification.

Interesterification of the diol with fatty esters of alcohols such as methanol, ethanol, and propanol as well as fatty esters of polyhydric alcohols such as glycol, propylene glycol, 1,3-propanediol, 1,4-butanediol, glycerol, erythritol, ribitol, sorbitol, mannitol, and others is a particularly good path to the diol monoesters. Mutual solvents are of good value including such solvents as dimethylformamide, dimethylacetamide, dimethylsulfoxide, dioxane, pyridine, xylene, and toluene. Catalysts of greatest value are such catalysts as sodium methoxide, benzyl trimethyl ammonium methoxide, sodium hydroxide and others described by Eckey, U.S. Pat. 2,442,532, at column 24, line 18 et seq.

The reaction products produced by interesterification and containing diol monoester can be recovered by inactivation of the catalyst with an appropriate acid such as acetic or phosphoric acid. The reaction products can be freed of solvents by distillation and used as prepared, or they can be purified by water washing and crystallization techniques to further enrich the diol monoester content. Crystallization from an aliphatic hydrocarbon solvent such as hexane is particularly effective in enriching the monoester in the crystalline phase. Solvent partition methods are also highly effective in concentrating the diol monoesters. Propylene glycol monostearate is a highly preferred emulsifier within the class just described.

Another class of very useful alpha-phase crystal-tending emulsifiers comprises the condensation product of either glycolic or lactic acid with a mixture of mono- and diglycerides which contain fatty acid radicals containing 14 to 22 carbon atoms. These emulsifiers can be prepared by interesterifying lactic or glycolic acid and mono- and diglycerides under partial vacuum and elevated temperatures of approximately 300° F. They may also be prepared by reacting glycerine, fatty acid, and lactic or glycolic acid. An example of a method of preparation in U.S. Pat. 2,690,971. A preferred emulsifier of this class is referred to herein as "lactic acid esters" and refers to a condensation product containing esters of lactic acid and fatty acid with glycerine in which the fatty acid is approximately one-half palmitic acid, one-half stearic acid, and having the following analysis: 4.5% fatty acid triglyceride; 22.7% fatty acid diglyceride; 4.9% fatty acid monoglyceride; 23.6% monolactyl, difatty acid glyceride; 36.4% monolactyl, mono-fatty acid glyceride; 4.2% free lactic acid; 3.7% lactyl glycerides; and a trace of free fatty acid.

Still a further illustrative class of alpha-phase crystal-tending emulsifiers comprises the partial esters of glycerine with a fatty acid having more than 20 carbon atoms and sufficiently saturated so as to have an iodine value of less than 10. Behenic acid partial esters of glycerine such as monobehenin and dibehenin are more specific examples of this type of compound. Natural oils, particularly rapeseed or herring oil, can be used as a convenient source of fatty acid for the compounds just described. A preferred emulsifier of this class is referred to herein as "rapeseed glyceride" and is defined as rapeseed oil which has been superglycerinated to form a mixture containing about 40% monoglyceride, 40% diglyceride, and 20% triglyceride, and hydrogenated to an iodine value of about 8. About 40% of these glycerides are $C_{22}$. Although not per se an alpha-phase crystal-tending emulsifier, the triglyceride portion of this mixture is included within the definition of "rapeseed glyceride" as it is believed to enhance the alpha-phase crystal-tending emulsification properties of the mono- and diglyceride portions.

The most highly preferred alpha-phase crystal-tending emulsifiers for use herein are propylene glycol monostearate and rapeseed glyceride used alone or in combination. The shortening can also contain minor amounts of conventional emulsifiers such as the higher fatty acid mono-and diglycerides.

The high temperature batter stabilizers which can be used in the practice of this invention are set forth, by way of example, as follows:

(a) The saturated fatty acids containing from about 14 to about 22 arbon atoms. A preferred high temperature batter stabilizer within this class is stearic acid.

(b) The condensation product of material selected from the group consisting of a partial fatty acid glyceride containing an average of from one to two fatty acid radicals having from about 14 to about 22 carbon atoms and a monoester of a straight chain aliphatic diol and a saturated fatty acid, said diol containing from 3 to 5 carbon atoms and said saturated fatty acid having from about 14 to about 22 carbon atoms, with a polycarboxylic acid containing from about 3 to 6 carbon atoms and having from 0 to 4 hydroxy groups, said condensation product having at least one free carboxyl group per molecule. An example of a preferred high temperature batter stabilizer within this class is stearoyl propylene glycol hydrogen succinate.

(c) The condensation product of a saturated fatty acid containing from about 14 to about 22 carbon atoms with a hydroxy polycarboxylic acid containing from 3 to 6 carbon atoms and having from 1 to 4 hydroxy groups, said condensation product having at least one free carboxyl group per molecule;

(d) The condensation product of a saturated straight chain fatty alcohol having from about 14 to about 22 carbon atoms with a dicarboxylic acid containing 3 to 6 carbon atoms and having no hydroxy groups, said condensation product having at least one free carboxyl group per molecule;

(e) The condensation product of partial fatty acid glyceride containing an average of from one to two fatty acid radicals having from about 14 to about 22 carbon atoms with a monoester of a polycarboxylic acid and a saturated straight chain fatty alcohol, said polycarboxylic acid containing from three to six carbon atoms and having from one to four hydroxy groups and said fatty alcohol having from about 14 to about 22 carbon atoms;

(f) The hydrogenated vegetable phosphatides having iodine values of less than about 30; and (g) The hydroxylated vegetable phosphatides.

The above class of high temperature batter stabilizers are illustrated in greater detail, including typical methods of preparation, in the description that follows hereinafter. For example, the saturated fatty acids which can be employed in this invention include: myristic, palmitic, stearic, arachidic, and behenic acids. These "long-chain" fatty acids can be readily obtained from hydrogenated glycerides by saponification, acidulation, and isolation procedures. The fatty acid desired determines the choice of glyceridic material used. Thus, a technical grade of stearic acid can be obtained from highly hydrogenated soybean oil and a technical grade of behenic acid can be obtained from highly hydrogenated rapeseed oil.

Specific condensation products of partial fatty acid glycerides or diol monoesters with polycarboxylic acids which can be used as high temperature batter stabilizers in the practice of this invention include the condensation product of malic, tartaric, citric, citramalic, trihydroxyl glutaric, mucic, saccharic, mannosaccharic, malonic, succinic, glutaric, methyl succinic, dimethyl succinic, adipic, tricarballylic, maleic, fumaric, itaconic, mesaconic, citraconic or aconitic acid with a monoglyceride, a diglyceride, or a mixture of mono- and diglycerides containing fatty acid radicals of the preceding-named "long chain" fatty acids, and if desired, unsaturated straight chain fatty acid radicals having from about 14 to about 22 carbon atoms in sufficient quantities to raise the iodine value of the condensation product not higher than 60, or with a monoester of propylene glycol, 1,3-propanediol, 1,4-butanediol, 1,3-butanediol, or 1,5-pentanediol with any of the preceding-named "long chain" fatty acids.

The condensation products of partial fatty acid glycerides or diol monoesters wtih polycarboxylic acids can be obtained by direct esterification. This reaction is advantageously carried out in a mutual solvent such as dimethyl formamide, dimethylacetamide, dioxane, xylene, and toluene, either with or without the use of a catalyst such as sulfuric acid, p-toluene sulfonic acid, hydrogen chloride, zinc chloride, and other such catalysts. The preparations are best carried out with reaction temperatures in the range of from about 75° C. to about 175° C. with water being removed by evolution under reduced pressure or by azeotropic distillation. The desired condensation products are isolated by appropriate distillation, and/or washing, and/or crystallization treatments when required to remove solvents, excess reactants and impurities. These condensation products should contain one or more unesterified carboxyl groups per molecule.

Among the condensation products of fatty acids and hydroxyl polycarboxylic acids which can be used in the practice of this invention, are the condensation products of the above-mentioned "long chain" fatty acids with malic, tartaric, citric, citramalic, trihydroxy glutaric, mucic, saccharic, and mannosaccharic acids.

The high temperature batter stabilizer condensation products of fatty acids and hydroxypolycarboxylic acids preferably are prepared by acylating the hydroxy polycarboxylic acid with fatty acid chlorides by reaction in appropriate solvents such as pyridine, quinoline, dioxane, dimethylformamide, dimethylacetamide and mixture thereof, either with or without addition of lipid solvents such as chloroform, benzene, and ethyl ether. These reactions can be carried out over a wide temperature range of from about 0° C. to about 150° C. or higher as long as undesirable side reactions are avoided. Upon completion of the acylation reaction, the stabilizers are isolated by dilution with an aqueous phase followed by washing, and/or distillation, and/or crystallization when required to remove solvents, excess reactants, and impurities. The method described in U.S. Pat. 2,251,695, granted to Tucker, Aug. 5, 1941, is an effective example of such a procedure. The condensation product obtained by this method should contain at least one free carboxyl group per molecule.

The condensation products of fatty alcohols and dicarboxylic acids which form suitable high temperature batter stabilizers include the condensation products of succinic, methyl succinic, dimethyl succinic, glutaric, malonic, adipic, maleic, or fumaric acids with saturated "long chain" fatty alcohols containing from about 14 to about 22 carbon atoms such as myristyl, cetyl, stearyl, arachidyl, and behenyl alcohols. These condensation products also should contain one free carboxyl group per molecule and can be prepared by the same procedures used to prepare the condensation products of the partial fatty acid glycerides or diol monoesters with polycarboxylic acids, using the appropriate dicarboxylic acid and fatty alcohol.

Examples of condensation products of partial fatty acid glycerides and monoesters of polycarboxylic acids which can be used as high temperature batter stabilizers in the practice of this invention are the condensation products of the above-mentioned mono- and/or diglycerides of the "long chain" fatty acids with monoesters of malic, tartaric, citric, citramalic, trihydroxy glutaric, mucic, saccharic, mannosaccharic, malonic, succinic, glutaric, methyl succinic, dimethyl succinic, adipic, tricarballylic, fumaric, itaconic, mesaconic, citraconic, or aconitic acid, with any of the preceding-named "long chain" fatty alcohols. A particularly desirable product of the class is stearyl monoglyceridyl citrate. These condensation products preferably are prepared by reacting the polycarboxylic acid with a mixture of the alcohols and a mixture of the mono- and diglycerides at elevated temperatures, for example, 150° C. to 165° C., in an inert atmosphere and under conditions where steam is removed.

The hydrogenated vegetatble phosphatide which can be used as a high temperature batter stabilizer in the practice of this invention is an ordinary vegetable phosphatide, such as soya or corn lecithin which has been substantially hydrogenated to an iodine value (I.V.) of less than about 30 and preferably to less than about 15. The hydrogenation can be conducted by various means, e.g., such as contacting the phosphatide with hydrogen in the presence of a catalyst with or without solvents at elevated temperatures and pressures. Examples of suitable methods of hydrogenation are described in U.S. Pat. 2,870,179, granted to Jacini, Jan. 20, 1959; U.S. Pat. 2,907,777, granted to Cole, Oct. 6, 1959; and U.S. Pat. 3,026,341, granted to Davis, Mar. 20, 1962.

An example of a vegetable phosphatide which can be used in the practice of this invention is commercial lecithin which has been hydrogenated to an iodine value of about 15. Commercial lecithin is derived principally from soybeans and is a crude phosphatide material which generally contains on the order of about 60 to 70% phosphatides and about 30% to 40% oil. This crude material contains not only lecithin, but also associated phosphatides such as cephalin and inositide. The commercial lecithins as well as the pure phosphatide compounds, such as lecithin, can be hydrogenated to form suitable materials for this invention.

Another treatment of vegetatble phosphatide which can be carried out to form suitable high temperature batter stabilizers for the practice of this invention is hydroxylation. Hydroxylation can be carried out by means of known hydoxylating reagents such as potassium permanganate and peracetic acid. Suitable mehods of praparation are described in U.S. Pat. 2,445,948, granted to Wittcoff, July 27, 1948. The hydroxylation will reduce the degree of unsaturation of the phosphatide such that the iodine value will be decreased by about 10 to about 50 units.

An an example of a suitable hydroxylated vegetable phosphatide, a commercial soy lecithin originally composed of about 65% phosphatide and 35% soybean oil can be hydroxylated to an iodine value of about 80. A suitable commercial hydroxylated lecithin is "Centrolene S."

The most highly preferred high temperature batter stabilizers for use herein are stearic acid, stearoyl proplyene glycol hydrogen succinate, or mixtures thereof.

The cake mixes of this invention contain at least 0.8% leavening soda. The minimum amount of leavening soda is very critical. Less than 0.8% leavening soda provides insufficient leavening to sustain the increased size of the cakes prepared from the mixes of this invention and thus results in improperly-formed and/or low volume cakes. A preferred amount of leavening soda is within the range of from 1.5%–3.0% for the devil's food-type mixes and from 1.0%–1.5% for the yellow-type and white-type mixes. Suitable leavening sodas are sodium, potassium bicarbonate.

The cake mixes of this invention contain a slow-acting leavening acid selected from the group consisting of sodium aluminum phosphate, dicalcium phosphate, and glucono-delta-lactone. The use herein of the above slow-acting leavening agents (for example, as compared to a conventional leavening acid such as sodium acid pyrophosphate) is critical to the formation of high volume and well-structured and appearing cakes from the highly emulsified, low sugar/flour ratio, mixes of this invention. The slow-acting leavening acid can be present in an amount within the range of from about 0.5 to about 2.0% by weight of the mix. Sodium aluminum phosphate is the preferred leavening acid. The term "sodium aluminum phosphate" is used generically herein to embody all of the various forms of sodium aluminum phosphate, e.g., heat-treated, hydrated, and potassium-containing forms of this material. Suitable sodium aluminum phosphates are described in U.S. Pats. 2,957,750, 2,995,421, 3,041,177, 3,205,073, and in British Pats. 1,033,022 and 1,033,023.

For many mixes it is accepted practice for the housewife to add the required amount of eggs to the mix in the course of batter preparation and this practice can be followed with the mixes of the invention. If desired, the inclusion of egg solids in the mix is an allowable alternative. The function and permissible variations in the remaining ingredients are apparent to those skilled in the art. For example, various amounts of ingredients such as flavors, colors, dry milk solids, water binders, e.g., a hydrophilic colloid such as carboxymethyl cellulose, salt and the like can be added if desired.

The dry prepared cake mixes of this invention can be compounded by blending the flour, sugar and shortening into a homogeneous premix in a ribbon blender, and then passing this premix through a hammermill to eliminate any lumps which may be formed. Additional ingredients can then be added, followed by mixing and further hammermilling to form a smooth free-flowing mix.

A preferred method of compounding the dry prepared mix is disclosed in U.S. Pats. 2,874,051, 2,874,052, and 2,874,053 in which a homogeneous blend is formed containing flour, sugar and shortening, and this blend is subjected to simultaneous shearing and crushing forces. Additional ingredients can then be added, followed by entoleting (impact grinding) to break up any large particles or agglomerates which might be present.

The following examples illustrate further specific embodiments of the invention.

EXAMPLE I

Yellow cake

A yellow-type dry prepared mix having the following composition was prepared:

| Ingredient: | Percent by weight |
|---|---|
| Flour (soft wheat cake flour including 2% corn starch) | 45.27 |
| Sugar (industrial fine granulated sucrose) | 38.94 |
| Shortening [1] | 11.00 |
| Sodium bicarbonate | 1.28 |
| Sodium aluminum phosphate | 1.10 |
| Nonfat dried milk solids | 1.00 |
| Salt | 0.90 |
| Carboxymethyl cellulose | 0.20 |
| Flavor and color | Balance |

[1] The shortening was prepared by melting together the following and plasticizing by rapidly cooling with agitation: 80% vegetable oil shortening comprising about 80% soybean oil and 20% cottonseed oil, which had been refined, bleached, deodorized, and hydrogenated to an iodine value of about 60; 14.0% alpha-phase crystal-tending emulsifiers comprised of 10% propylene glycol monostearate and 4% rapeseed glyceride; 0.25% high temperature batter stabilizer comprised of stearic acid; and 5.75% propylene glycol distearate (an inert by-product of propylene glycol monostearate).

The mix was made by blending together thoroughly the flour, sugar and shortening in a paddle mixer, and then passing the blend through a roller mill. After the milling step, the remaining ingredients were added and the final mixture was subjected to entoleting.

Batter was made by adding three whole eggs and 1⅓ cups of water to 19.0 ounces (540 grams) of the mix. The batter was then mixed on a conventional household electric mixer for 3 minutes at high speed (875 r.p.m.) and for one minute at medium speed (450 r.p.m.). Two 9-inch round cake pans (each pan representing one layer of a two-layer cake) were each filled with 492 grams of batter and then baked at 350° F. for about 30 minutes. After cooling for 30 seconds, the center height and edge height of the layer from each pan was measured and the volume of each layer was calculated. These data are recorded in Table 1.

EXAMPLE II

White cake

A white-type dry prepared cake mix having the following composition was prepared in the same manner as the mix of Example I:

| Ingredient: | Percent by weight |
|---|---|
| Flour (soft wheat cake flour including 6% wheat starch and 3% high-protein flour) | 46.29 |
| Sugar (industrial fine granulated sucrose and dextrose) | 37.56 |
| Shortening [1] | 9.50 |
| Sodium bicarbonate | 1.12 |
| Sodium aluminum phosphate | 1.47 |
| Nonfat dried milk solids | 3.00 |
| Salt | 0.75 |
| Flavor | Balance |

[1] The shortening was prepared as in Example I and contained: 87% vegetable oil shortening comprising about 80% soybean oil and 20% cottonseed oil, which had been refined, bleached, deodorized, and hydrogenated to an iodine value of about 60; 8.5% alpha-phase crystal-tending emulsifiers comprised of propylene glycol monostearate; 0.2% high temperature batter stabilizer comprised of stearic acid; and 4.3% propylene glycol distearate (an inert by-product of propylene glycol monostearate).

Batter was made by adding three egg whites and 1½ cups of water to 19.5 ounces of the mix. The batter was mixed on a conventional household electric mixer for 3 minutes at high speed (875 r.p.m.) and for 1 minute at medium speed (450 r.p.m.). Two 9-inch round cake pans were each filled with 492 grams of batter and then baked at 350° F. for about 28 minutes. Data was obtained as in Example I and is recorded in Table 1.

EXAMPLE III

Devil's food cake

A devil's food-type dry prepared cake mix having the following composition was prepared in the same manner as the mix of Example I:

| Ingredient: | Percent by weight |
|---|---|
| Flour (soft wheat cake flour including 0.5% high-protein wheat flour) | 38.35 |
| Sugar (industrial fine granulated sucrose and dextrose) | 39.76 |
| Shortening [1] | 11.00 |
| Sodium bicarbonate | 2.45 |
| Sodium aluminum phosphate | 0.70 |
| Nonfat milk solids | 1.00 |
| Carboxymethyl cellulose | 0.20 |
| Salt | 1.00 |
| Cocoa | 6.00 |
| Flavor | Balance |

[1] The shortening was prepared as in Example I and contained: 83% vegetable oil shortening comprising about 80% soybean oil and 20% cottonseed oil, which had been refined, bleached, deodorized, and hydrogenated to an iodine value of about 60; 12.5% alpha-phase crystal-tending emulsifiers comprised of 8.5% propylene glycol monostearate and 4% rapeseed glyceride; 0.25% high temperature batter stabilizer comprised of stearic acid, and 4.25% propylene glycol distearate (an inert by-product of propylene glycol monostearate).

Batter was made by adding three whole eggs and 1⅓ cups of water to 19.0 ounces of the mix. The batter was mixed on a conventional household electric mixer for 3 minutes at high speed (875 r.p.m.) and for 1 minute at medium speed (450 r.p.m.). Two 9-inch round cake pans were each filled with 492 grams of batter and then baked at 350° F. for about 32 minutes. Data was obtained as in Example I and is recorded in Table 1.

EXAMPLE IV

Devil's food cake (Swiss-chocolate variety)

A Swiss-chocolate variety of a devil's food-type dry prepared cake mix having the following composition was prepared in the same manner as the mix of Example I:

| Ingredient: | Percent by weight |
|---|---|
| Flour (soft wheat cake flour including 1.50% high-protein wheat flour) | 41.23 |
| Sugar (industrial fine granulated sucrose and dextrose) | 34.52 |
| Shortening [1] | 10.00 |
| Sodium bicarbonate | 1.90 |
| Sodium aluminum phosphate | 1.20 |
| Nonfat milk solids | 3.50 |
| Buttermilk solids | 0.50 |
| Carboxymethyl cellulose | 0.20 |
| Salt | 0.90 |
| Cocoa | 5.50 |
| Flavor | Balance |

[1] The shortening was prepared as in Example I and contained: 83% vegetable oil shortening comprising about 80% soybean oil and 20% cottonseed oil, which had been refined, bleached, deodorized, and hydrogenated to an iodine value of about 60; 12.5% alpha-phase crystal-tending emulsifiers comprised of 8.5% propylene glycol monostearate and 4.0% rapeseed glyceride; 0.25% high temperature batter stabilizer comprised of stearic acid; and 4.25% propylene glycol distearate (an inert by-product of propylene glycol monostearate).

Batter was made by adding two whole eggs and 1⅓ cups of water to 19.0 ounces of the mix. The batter was mixed on a conventional household electric mixer for 3 minutes at high speed (875 r.p.m.) and for 1 minute at medium speed (450 r.p.m.). Two 9-inch round cake pans were each filled with 468 grams of batter and then baked at 350° F. for about 30 minutes. Data was obtained as in Example I and is recorded in Table 1.

All of the cakes prepared in Examples I–IV above had very large specific volumes and delectable eating qualities as well as normal cake structure (e.g., proper degree of tenderness, grain, texture, shrinkage, and crust) and appearance (e.g., symmetry, domed top, and overall general external appearance).

In each of the above examples, the sodium aluminum phosphate was a commercially available variety obtained under the name "Levair." Substantially equivalent results are achieved in that large volume delectable cakes are prepared when this sodium aluminum phosphate is replaced by a slow-acting leavening acid selected from the group consisting of other sodium aluminum phosphates, di-calcium phosphate, and glucono-delta-lactone.

Also in each of the above examples, substantially equivalent results are obtained when:

The vegetable oil shortening is replaced by plastic, liquid or semi-fluid glyceride shortening derived from animal, or marine fats and oils, or synthetically prepared shortening;

The alpha-phase crystal-tending emulsifiers are replaced by alpha-phase crystal-tending emulsifiers selected from the group consisting of lactic acid esters, and monoesters of straight chain aliphatic diols with saturated fatty acids, said diols containing from 3 to 5 carbon atoms and said saturated fatty acids containing from about 14 to about 22 carbon atoms, e.g., propylene glycol monopalmitate, 1,3-propanediol monostearate, and 1,5-pentanediol monostearate;

The high temperature batter stabilizer is replaced by one or mixtures of the following high temperature batter stabilizers: hydrogenated lecithin (I.V.=15), citric acid ester of mono- and diglycerides, behenic acid, malic palmitate, stearoyl lactic acid, tartaric distearate, distearin hydrogen succinate, octadecyl hydrogen succinate, stearoyl propylene glycol hydrogen succinate, and stearoyl propylene glycol hydrogen glutarate.

In order to have a "standard" to which cakes baked from the mixes of the present invention could be compared, yellow, white, devil's food and Swiss chocolate types of a leading commercially available brand of dry prepared cake mix were obtained and cakes were baked therefrom according to the label instructions. These instructions comprised a duplication of the technique described above in Examples I–IV respectively except that two eggs were used (instead of three as in Examples I, II and III) and batter was mixed on a conventional household electric mixer for 2 minutes at medium speed (instead of 3 minutes at high speed and 1 at minute speed as in Examples I–IV).[1] In the case of the white-type cake, 1⅓ cups of water were added to 19.0 ounces of dry prepared mix (instead of 1½ cups of water added to 19.5 ounces of mix as in Example II). Data for these cakes is presented in Table 1 in the rows entitled "standard."

cakes. Moreover, the cakes of the present invention were compared with these same standard cakes in areas of cake structure, appearance and eating quality, and were found to be essentially similar.

As discussed hereinbefore, the maximum sugar/flour ratio, the minimum amounts of alpha-phase crystal-tending emulsifiers and high temperature batter stabilizers, the minimum amount of leavening soda, and the use of certain slow-acting leavening acids, are each critical elements to particular aspects of the ultimate cake product prepared from the mixes of this invention. In general, however, it is believed that the overall combination of these elements is the key feature in providing the unique cakes obtained from the prepared mixes disclosed and claimed herein.

I claim:

1. A dry prepared culinary mix suitable for the preparation of yellow-type cakes, which consists essentially of by weight: 40%–50% cake flour; 30%–40% sugar, the ratio of sugar to flour being within the range of from about 0.7:1 to about 0.9:1; 9%–15% shortening containing 12%–20% of an alpha-phase crystal-tending emulsifier selected from the group consisting of rapeseed glyceride, and monoesters of straight chain aliphatic diols with saturated fatty acids, said diols containing from 3 to 5 carbon atoms and said saturated fatty acids containing from about 14 to about 22 carbon atoms, and 0.1%–5% high temperature batter stabilizers; 1.0%–1.5% leavening soda; and 0.8%–1.5% of a slow-acting leavening acid selected from the group consisting of sodium aluminum phosphate, dicalcium phosphate, and glucono-delta-lactone.

2. A dry prepared culinary mix suitable for the preparation of white-type cakes, which consists essentially of by weight: 40%–55% cake flour; 30%–40% sugar, the ratio of sugar to flour being within the range of from about 0.7:1 to about 0.9:1; 8%–12% shortening containing 6%–12% alpha-phase crystal-tending emulsifier selected from the group consisting of rapeseed glyceride, and monoesters of straight chain aliphatic diols with saturated fatty acids, said diols containing from 3 to 5 carbon atoms and said saturated fatty acids containing from about 14 to about 22 carbon atoms, and 0.1%–3% high temperature batter stabilizers; 1.0%–1.5% leavening soda; and 1%–2% of a slow-acting leavening acid selected from the group consisting of sodium aluminum phosphate, dicalcium phosphate, and glycono-delta-lactone.

TABLE 1.—VOLUME CHARACTERISTICS OF CAKES PREPARED IN EXAMPLES I–IV AS COMPARED TO STANDARD CAKES OF THE SAME TYPE

| Cake | Type of cake | Center height [1] | Edge height [1] | Volume [2] | Specific volume [3] | Percent increase [4] |
|---|---|---|---|---|---|---|
| Example I | Yellow | 2.40 | 1.85 | 2,080 | 3.85 | 30.5 |
| Standard | | 1.82 | 1.43 | 1,591 | 2.95 | |
| Example II | White | 2.08 | 1.64 | 1,821 | 3.29 | 24.6 |
| Standard | | 1.65 | 1.27 | 1,428 | 2.64 | |
| Example III | Devil's food | 2.41 | 1.85 | 2,085 | 3.86 | 24.5 |
| Standard | | 1.91 | 1.51 | 1,674 | 3.10 | |
| Example IV | Devil's food, Swiss chocolate. | 2.25 | 1.84 | 2,004 | 3.71 | 23.7 |
| Standard | | 1.83 | 1.48 | 1,621 | 3.00 | |

[1] Average each layer inches.
[2] Average each layer, ca. in cc.
[3] Average each layer, ca. in cc./gram of dry prepared mix.
[4] In specific volume of example cakes compared to standard cakes.

It can be observed from Table 1 that cakes prepared from the mixes of the present invention exhibit a specific volume that is 23.7%–30.5% greater than standard. This outstanding difference is particularly significant because the cakes from which the standard values are calculated were prepared from a leading commercially available brand which is generally recognized as the brand which is of the highest quality and yields the largest volume 3. A dry prepared culinary mix suitable for the preparation of devil's food-type cakes, which consists essentially of by weight: 38%–45% cake flour; 30%–41% sugar, the ratio of sugar to flour being within the range of from about 0.7:1 to about 1.05:1; 9%–15% shortening containing 10%–20% alpha-phase crystal-tending emulsifier selected from the group consisting of rapeseed glyceride, and monoesters of straight chain aliphatic diols with saturated fatty acids, said diols containing from 3 to 5 carbon atoms and said saturated fatty acids containing from about 14 to about 22 carbon atoms, and 0.1%–4% high temperature batter stabilizers; 1.5%–

---

[1] In further experiments, it was shown that the addition of an extra egg and/or more extensive batter mixing did not significantly affect the physical characteristics of cakes prepared from the commercially available mixes.

3.0% leavening soda; and 0.2%–1.5% of a slow-acting leaving acid selected from the group consisting of sodium aluminum phosphate, dicalcium phosphate, and glucono-delta-lactone; and 2%–8% cocoa.

References Cited
UNITED STATES PATENTS

| | | | |
|---|---|---|---|
| 2,478,618 | 8/1949 | Armstrong et al. | 99—95X |
| 3,170,795 | 1/1965 | Andre | 99—94 |
| 3,268,337 | 8/1966 | Howard et al. | 99—94X |
| 3,268,338 | 8/1966 | Strobel | 99—94X |
| 3,428,461 | 2/1969 | Hatton et al. | 99—94 |

LIONEL M. SHAPIRO, Primary Examiner

J. R. HOFFMAN, Assistant Examiner

U.S. Cl. X.R.

99—92